United States Patent [19]
Fishman et al.

[11] 3,718,043
[45] Feb. 27, 1973

[54] IONIZATION GAS FLOW METER WITH PULSE RATE SERVO

[75] Inventors: Jack B. Fishman, Pasadena; William E. Mutschler, La Verne, both of Calif.

[73] Assignee: Nucleonics Development Company, Monrovia, Calif.

[22] Filed: Dec. 15, 1970

[21] Appl. No.: 98,280

[52] U.S. Cl............................73/194 F, 250/43.5 FC
[51] Int. Cl...............................................G01f 1/00
[58] Field of Search....250/43.5 FC; 73/194 E, 194 F

[56] References Cited

UNITED STATES PATENTS

| | | | |
|---|---|---|---|
| 2,637,208 | 5/1953 | Mellen | 250/43.5 FC X |
| 2,640,936 | 6/1953 | Pajes | 250/43.5 FC X |
| 3,302,446 | 2/1967 | Schmitt et al. | 73/194 E X |

Primary Examiner—Archie R. Borchelt
Attorney—Lindenberg, Freilich & Wasserman

[57] ABSTRACT

An injection flow meter is provided with means for triggering an X-ray beam generator to produce a sheet of ions in gas flowing in a pipeline at a rate determined by a voltage controlled oscillator having a period approximately equal to the transit time of a sheet of ions to a detector downstream. A logic network, activated at approximately the time an ion sheet is to be detected in order to lock out spurious detector pulses, continually determines whether the ion sheet arrives before or after the X-ray beam generator is retriggered to so adjust the control voltage that the X-ray beam generator is continually retriggered at substantially the same time ion sheets are being detected. A failure to detect ion sheets will not affect the last established control voltage thereby dividing the flow into a number of precise units of volume even in the absence of detector pulses.

10 Claims, 5 Drawing Figures

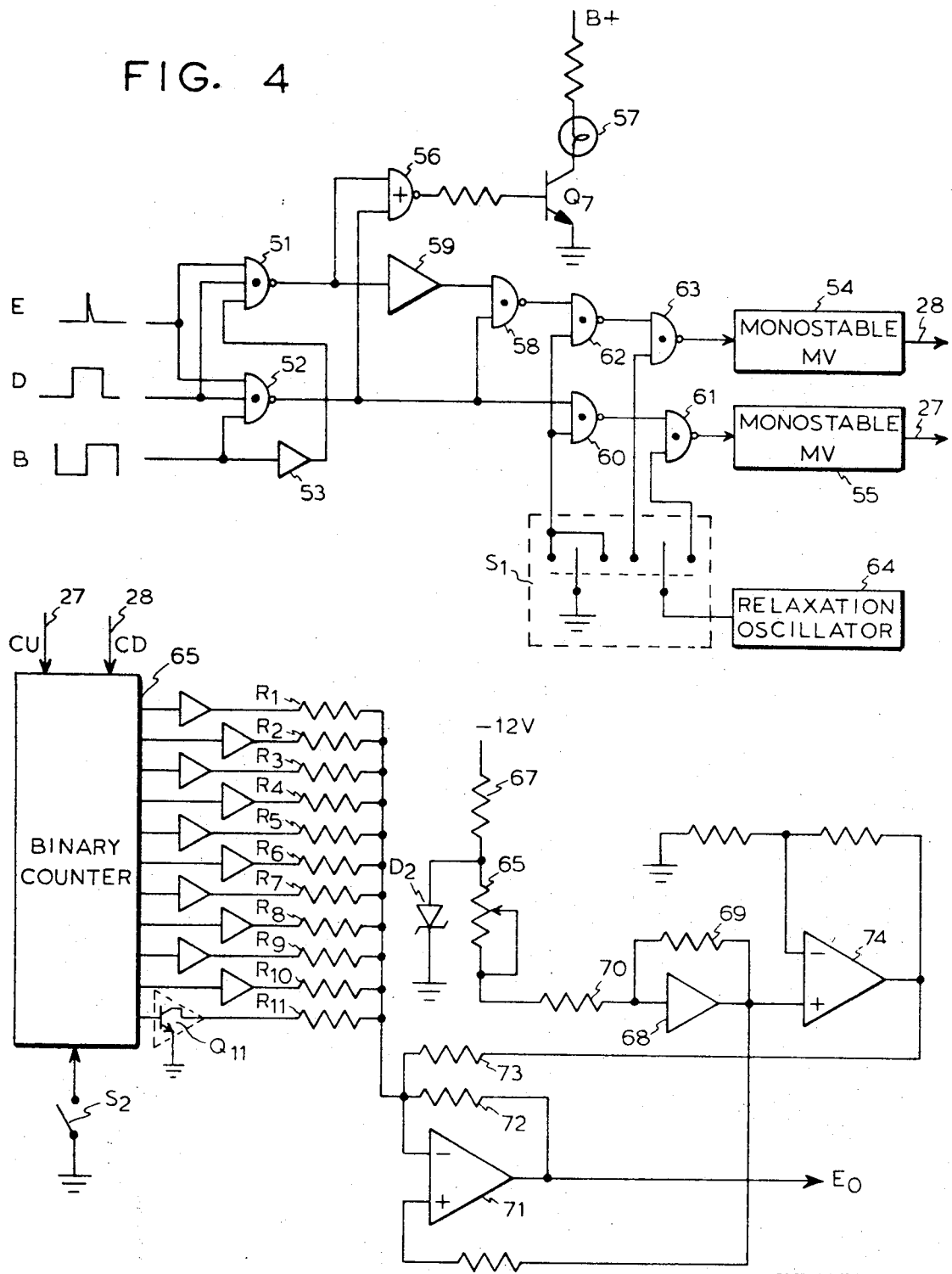

IONIZATION GAS FLOW METER WITH PULSE RATE SERVO

BACKGROUND OF THE INVENTION

This invention relates to a tracer injection flow meter, and particularly to an ionization flow meter for monitoring flow rates, such as in natural-gas transmission lines.

Orifice meters commonly used in natural-gas transmission lines present various problems and difficulties, such as maintaining the orifice diameter constant due to an accumulation of dirt particles over a period of time, and maintaining a constant flow velocity. A flow meter utilizing a gas ionization principle will overcome the problems and difficulties of an orifice meter, but for volume flow measurements, system utilizing the gas ionization principle which have been developed in the past have been deficient in accuracy.

A flow meter utilizing the gas ionization principle consists of means for ionizing the gas flow at a fixed point in a pipeline to create an ion cloud. This cloud of ions is detected at a point a fixed distance downstream. The detection time lapse is then divided into the distance between the point of ionization and the point of detection to obtain flow velocity. From the dimensions of the pipeline, the volume flow is also determined.

For monitoring flow rates on a continual basis, it has been standard practice to generate a pulse for triggering the ionizing means in response to the last ion cloud detected downstream. The rate at which these trigger pulses are generated is then proportional to the flow rate. By counting the number of trigger pulses, a continuous indication of the total volume of gas flow is obtained.

This ionization technique resembles the conventional technique of injecting a tracer into the flow stream and detecting its presence downstream. However, the ionization technique has several major advantages. The principal advantage is that no foreign material is injected into the flow stream. Since the flowing gas itself is only momentarily transformed to produce the tracer, the gas delivered to the user is in its initial form with no changes. Another advantage is that there is no time lag for the tracer to assume the flow rate of the gas and there is no disturbance to the flow of the gas itself or dispersion of the tracer in the gas. Still another advantage is that since the ionizing radiation travels at the speed of light, a complete sheet of ions may be created across the pipe almost instantaneously (in a period of the order of $10^{-9}$ seconds). Temperature, pressure, density and gas composition have no effect on this ionization technique. Since the downstream ion detector is passive, it introduces no disturbance to the flow. The detector will respond to the abrupt change in current produced as the ion sheet passes, and is not dependent on the quantity of ions as long as a predetermined minimum quantity is present.

Although an ionization meter overcomes the problems of the orifice meter, and does not involve the injection of a foreign material into the flow stream, accurate measurements of flow rates and total gas flow is not possible with present ionization meters because turbulence within the pipeline may cause the sheet or cloud of ions to flow around the probe of the detector such that the measuring system will not register the passage of a unit of volume. Although this phenomenon will not occur very frequently, the error thus produced is cumulative so that after a period of time the total quantity of gas not registered will be significant.

Another problem which exists with ionization meters is that foreign matter in the gas may occasionally strike the detection probe and produce random noise pulses. Since some of these noise pulses may be of sufficient amplitude to be registered by the measuring system, there is a possibility that a customer may be charged for undelivered units of gas. While this type of error may be offset by the occasional failure to detect the passage of an ion cloud, it is not possible to anticipate that one type of error will always offset the other. In any case, either type of error may produce a significant error in flow rate measurement over a short period of time.

While the preferred embodiment of the present invention is in an ionization meter, because of the inherent advantages just pointed out, it should be understood that in its broadest aspects, the present invention may be advantageously employed in many known tracer injection flow meters.

OBJECTS AND SUMMARY OF THE INVENTION

An object of the present invention is to provide a tracer injection meter that will register a unit of gas flow even though there is a failure to detect the passage of an injected tracer.

Still another object is to provide a tracer injection meter that will not register noise pulses which may occur between tracer detection pulses.

Yet another object is to provide a tracer injection meter that will continue to register gas flow during a failure to detect tracers based on the current flow rate at the time of failure.

These and other objects of the invention are achieved in a tracer injection meter having means at a fixed station for injecting a tracer in a fluid flow stream, and means for detecting the tracers as they flow past a fixed station downstream from the ionization station. An oscillator controlled by a voltage signal is employed to drive a square-wave signal generator which triggers the tracer injection means at the center of each cycle.

The voltage controlled oscillator is also employed to drive a generator of gating pulses that are centered about the center of the square-wave signal, and therefore are centered on the triggering times of the tracer injections. Means comprising a digital logic network receives the output signals of the tracer detecting means, the square-wave signal, and the gating pulses to determine whether a tracer is being detected at approximately the time the tracer injecting means is being triggered, and to further determine whether the tracer is detected too early or too late with respect to the triggering of the tracer generating means. The logic network means produces an error pulse of a given binary characteristic if the tracer is detected late. Pulses of the given characteristic are integrated, and the result of integration is combined with the reference voltage to decrease the period of the oscillator. Pulses of complementary characteristic produced by the logic network means when the tracers are detected too early are also integrated with the opposite effect on the control voltage. When there is a momentary or temporary failure to detect tracers, error pulses are not produced, and the control voltage is left at the last adjusted level to provide continued indication of gas flow at the rate established at the time of failure.

BRIEF DESCRIPTION OF THE DRAWINGS

FIG. 4 illustrates a logic network employed in the system of FIG. 1.

FIG. 5 illustrates a circuit employed in the system of FIG. 1 for integrating error pulses and for continually combining the result of integration with a reference voltage.

DESCRIPTION OF PREFERRED EMBODIMENTS

Figure 1:
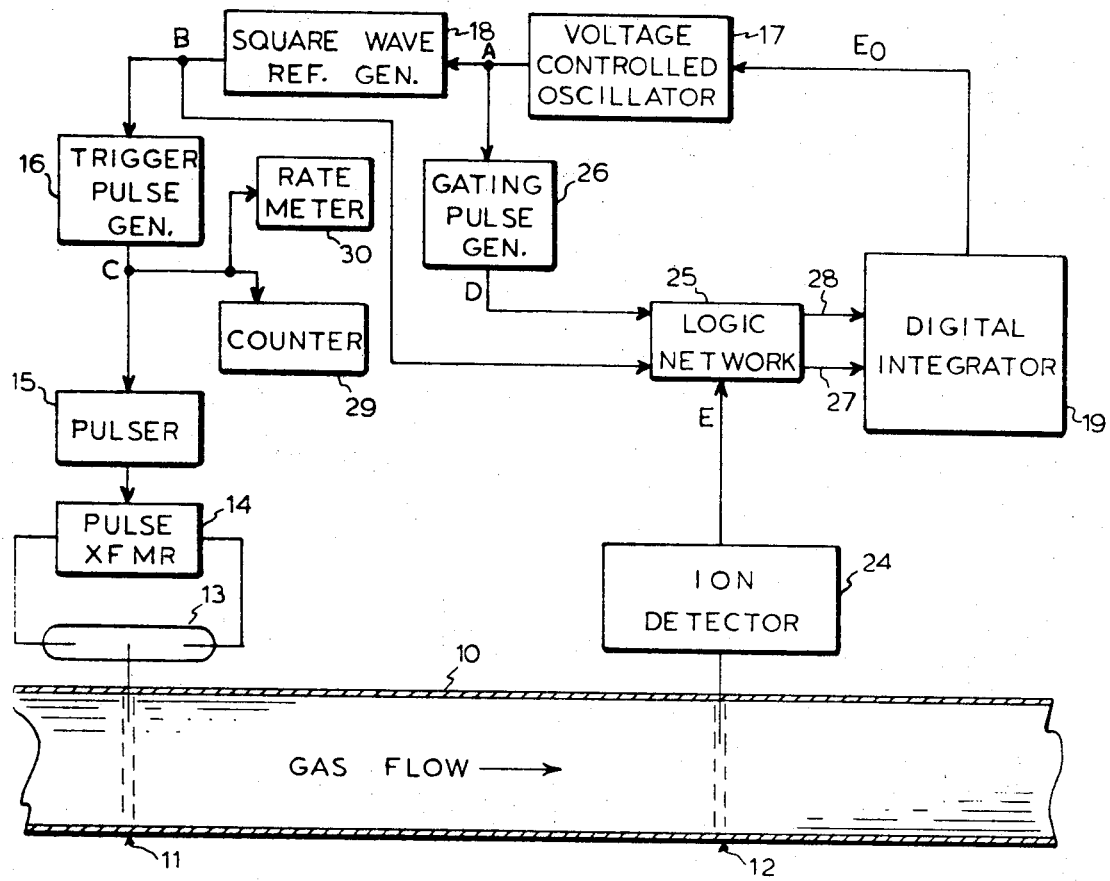
FIG. 1 illustrates schematically a preferred embodiment of the present invention.

Referring now to FIG. 1, the ionization type of injection meter embodying the present invention is shown monitoring flow rates in a natural gas transmission line 10, but it should be understood that the ionization meter may be employed to equal advantage for monitoring flow rates of any gas in a pipe.

Flowing gas is ionized at a fixed station 11 by a transverse fan-shaped beam of relatively low-energy electromagnetic radiation. This beam produces a sheet of ions, and in that way effectively injects a tracer that is detected at a fixed station 12 a predetermined distance (a few feet) downstream. To produce the beam, an X-ray (vacuum diode) tube 13 is triggered by a short (1 ms) high voltage pulse through a transformer 14 by a pulser 15 in a conventional manner using techniques developed in medical X-ray equipment.

Each cycle of the pulser 15 is initiated by a pulse from a generator 16 driven by an oscillator 17 through a square-wave generator 18. The oscillator is preferably one which may be directly controlled by a voltage signal $E_0$ derived directly from a digital integrator 19 to be described with reference to FIG. 5.

An ion detector 24 comprising a probe in the pipe 10 detects each sheet of ions at a station 12 and transmits a pulse through a logic network 25. The logic network receives timing signals from the square-wave generator 18 and a gating pulse generator 26 to determine whether a sheet of ions produced at the station 11 is being detected at the station 12 early or late with respect to the time the trigger pulse generator 16 again pulses the X-ray tube 13 through the transformer 14 to produce another sheet of ions. If it is determined that a sheet of ions has been detected early, the logic network 25 causes a pulse to be applied to the integrator 19 via a line 27 to increase the control voltage $E_0$ applied to the oscillator 17, and thereby decrease the oscillator period (increase the oscillator frequency). If it is determined that a sheet of ions is detected late, an error pulse is applied to the integrator 19 via a line 28, thereby decreasing the control voltage $E_0$ to increase the period (decrease the frequency) of the oscillator 17.

Once a sufficient number of error pulses have been integrated to adjust the period of the oscillator 17 to a value substantially equal to the transit time of the gas flow from the station 11 to station 12, the logic network 25 will continue to make definitive "too early" and "too late" determinations. Therefore, the servo control thus provided may hunt back and forth around the period precisely equal to the transit time between the stations 11 and 12, but only while the ion detector 24 is transmitting pulses to the logic network 25. To minimize this hunting effect, the change in the control voltage $E_0$ produced by each pulse is selected to be sufficiently small to maintain the period of the oscillator substantially stable.

If turbulence exists within the pipeline 10, and the ion detector 24 fails to detect the passage of an ion sheet, the logic network 25 will not transmit an error pulse on either line 27 or line 28, thereby leaving the control voltage $E_0$ unaltered. The oscillator 17 will then continue to operate at the last adjusted frequency to time the generation of subsequent sheets of ions. A counter 29 accumulates the trigger pulses from the generator 16 to provide an accurate measure of the quantity of gas transmitted through the pipeline. If the X-ray tube 13 were not pulsed at approximately the time an ion sheet is being detected, because the detector misses the passage of an ion sheet, there would be a failure to record accurately the last unit of gas transmitted past the station 11. If several successive ion sheets are not detected because of a momentary or temporary failure to ionize sheets of gas, or to detect ionized sheets, the oscillator 17 will continue to drive the trigger pulse generator 16 to supply pulses to the counter 29 at a steady rate based on the X-ray trigger rate established at the time of failure.

If foreign matter present in the gas should strike the probe of the ion detector 24 in such a manner as to produce random noise pulses of sufficient amplitude to cause the logic network 25 to perform its function, they will be rejected by the logic network 25 unless they occur within the period of a pulse from the generator 26 centered about that point in the period of the output from the oscillator 17 at which the X-ray tube 13 is pulsed. If such a noise pulse should occur during the period of a pulse from the generator 26, either before or after the ion sheet is actually detected, a spurious "too early" error pulse may be applied to the integrator 19 via line 27 thereby erroneously altering the frequency of the oscillator 17. However, the counter 29 responds to only the pulse transmitted by the trigger pulse generator 16, and the effect of erroneously adjusting the frequency of the oscillator 17 will be quickly corrected by the logic network during the next cycle of the oscillator 17.

Figure 2:
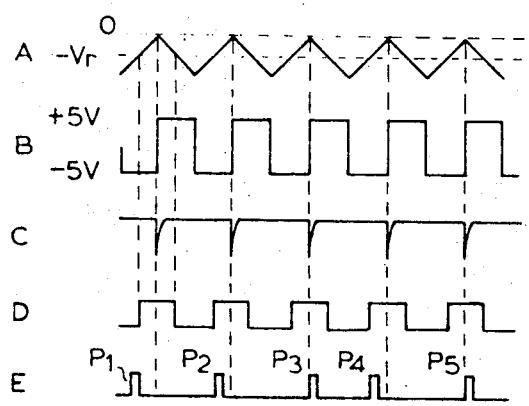
FIG. 2 illustrates a timing diagram of signal waveforms appearing at designated points in FIG. 1.

Operation of the illustrated embodiment of the present invention may best be understood from waveforms A to E of FIG. 2 which appear at points indicated by corresponding reference letters in FIG. 1. Each cycle of the waveform A produced by the oscillator 19 drives the square-wave generator 18 to produce the waveform B. The trigger pulse generator 16 differentiates the square waveform B to produce the negative going trigger pulses of the waveform C. Each trigger pulse actuates the pulser 15 to trigger the X-ray tube 13 through the transformer 14. The trigger pulses are also applied to the counter 27, as noted hereinbefore.

The waveform A also drives the gating pulse generator 26 to produce the waveform D applied together with the waveform B to the logic network 25. Each ion sheet produced at station 11 by a trigger pulse of waveform C is detected at the station 12 by the ion detector 24 which transmits a pulse to the logic network 25 as shown by the waveform E. The first ion detector pulse $P_1$ occurs before the X-ray trigger pulse of the first cycle of the oscillator 17 shown. The logic network 25 determines that the pulse $P_1$ has occurred too early by noting that it has occurred while only the waveform D of the waveforms B and D is positive. Accordingly, the logic network 25 produces a pulse of fixed duration to drive the integrator 19. The result is an increase in the control voltage $E_0$ to decrease the period of the oscillator 17.

It is assumed that the correction introduced by the error pulses produced on line 27 is not sufficient to completely adjust the period of oscillator 17 after the first return pulse $P_1$ from the ion detector 24. Then the second return pulse $P_2$ also occurs too early and produces another error pulse on the line 27 to further decrease the period of the oscillator 17.

It should be noted that comparison is made between the leading edge of each return pulse of the waveform C and a positive going edge of the waveform B, but that comparison is restricted to a fraction of the period of the waveform B by the waveform D. It should further be noted that the relative amplitudes and periods of the waveforms shown have been selected for purposes of explanation only. In practice, the periods of the gating pulses of the waveform D are selected to be 10 percent of the period of the waveform A.

Assuming that the second error pulse adjusts the period of the oscillator 17 to precisely the transit time of a sheet of ions, the third return pulse $P_3$ will occur precisely at the center of the next cycle of the oscillator 17. In that event there is ambiguity as to whether an ion detector pulse $P_3$ has occurred early (while only the waveform B is positive) or late (when both the waveforms B and D are positive). Under those conditions, it would be ideal for either both or neither a "too early" nor a "too late" error pulse to be produced. The net voltage change applied to the integrator 19 would then be zero and the period of the oscillator 17 would remain unchanged. However, it is more convenient to design the logic network to resolve the ambiguity by determining that it has occurred early. Each "too early" error pulse produced inhibits that part of the logic network employed to determine when the return pulse has occurred too late.

If the velocity of the gas flowing through the line 10 remains unchanged, the next return pulse $P_4$ will occur too early and an error pulse will be produced on the line 27. The next return pulse $P_5$ will then occur too late, thereby causing an error pulse to be produced on line 28. Thereafter, the logic network 25 may continue to cause error pulses to be produced alternately on lines 27 and 28 as long as the velocity of the gas does not change. Thus, as noted hereinbefore, the servo control provided may cause the period of the oscillator 17 to hunt, but if the correction introduced by each error pulse is very small, the resulting changes in the period of the oscillator 17 will be very small. In any event, the average period of the oscillator 17 will be correct and the quantity of gas registered by the counter 29 will be accurate. Moreover, the degree of accuracy achieved will not depend upon the gas flow rate.

A rate meter 30 is connected to receive trigger pulses from the generator 16 and display the current flow rate in appropriate units. For example, each trigger pulse may be applied to monostable multivibrator of fixed period. The output of the multivibrator may then gate pulses of constant height and width at a fixed rate to an RC integrator. The desired scaling is then selected by setting the rate of the pulses applied to the integrator. Scaling may also be achieved by varying the resistance of the discharge path of the integrating capacitor while holding the rate of the gated pulses constant.

Figure 3:
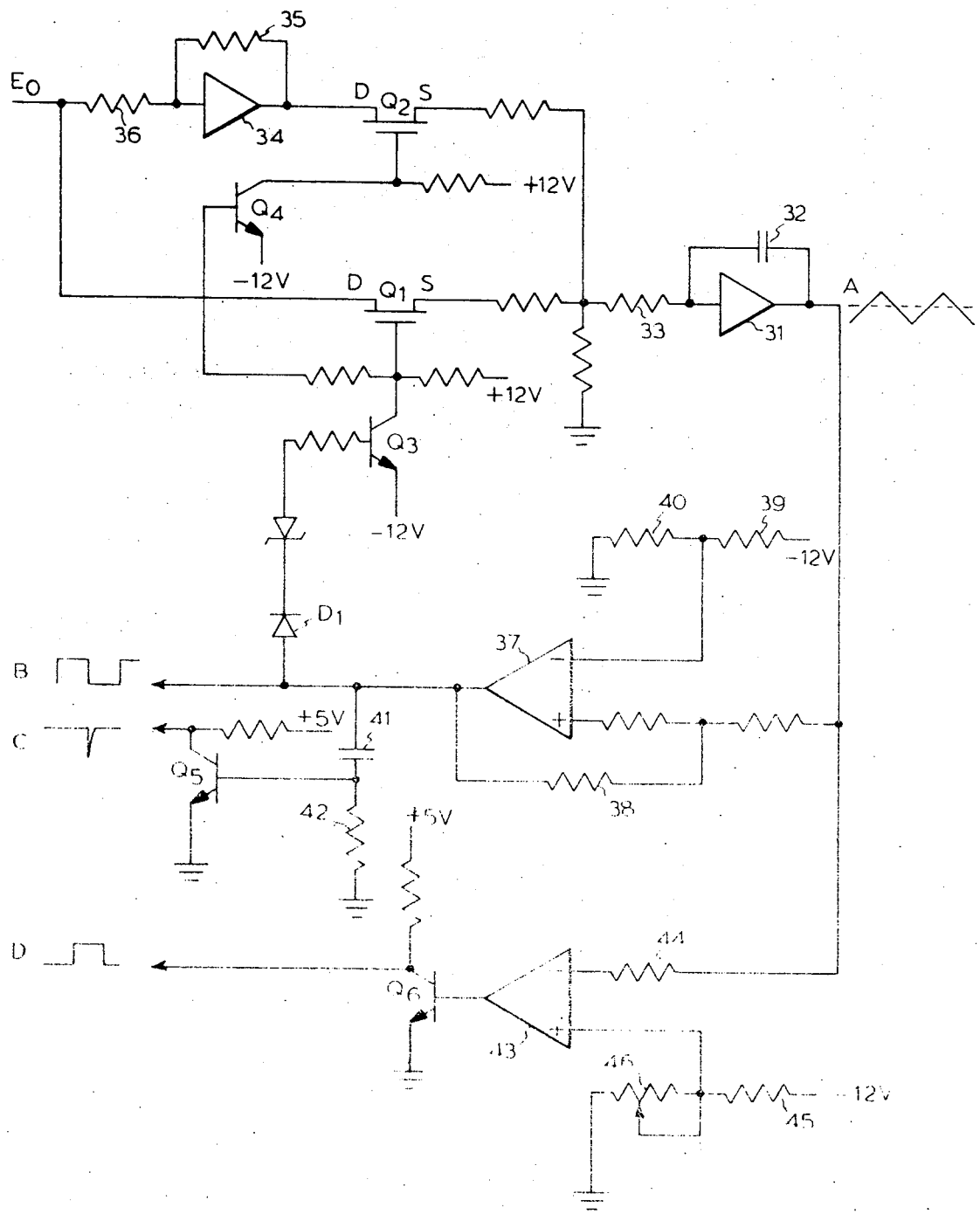
FIG. 3 illustrates a circuit employed in the system of FIG. 1 for generating the signals of waveforms A, B, C and D, of FIG. 2.

Referring now to FIG. 3, a circuit for generating the waveforms A, B, C and D of FIG. 2 will now be described. The oscillator for generating the sawtooth waveform A comprises an integrator consisting of an operational amplifier 31 and a feedback capacitor 32 connected by a resistor 33 to receive from the digital integrator 19 (FIG. 1) the control voltage $E_0$ of positive and negative polarities through field-effect transistors $Q_1$ and $Q_2$. An operational amplifier 34 having a negative feedback resistor 35 receives the positive control voltage ($+E_0$) through a resistor 36 and delivers to the drain of the transistor $Q_2$ the negative control voltage ($-E_0$). Assuming that the positive control voltage is +5 volts, and that the transistor $Q_1$ has been conducting for some time, the output of the amplifier 31 will be at −5 volts, the starting point for a cycle of the waveform A in FIG. 2.

A comparator comprising a high gain differential amplifier 37 having a feedback resistor 38 to the positive input terminal compares the output of the amplifier 31 with a fixed reference provided by a voltage dividing network consisting of resistors 39 and 40. Assuming the fixed reference is slightly less than −5 volts, such as −4.95 volts, when negative going the output of the amplifier 31 becomes more negative than that reference, the output of the comparator switches from a level of about +4.95 volts to a level of about −4.95 volts. The negative output of the comparator then reverse biases a diode $D_1$ to turn a transistor $Q_3$ off, thereby turning the field-effect transistor $Q_1$ off and, through a transistor $Q_4$, turning the field-effect transistor $Q_2$ on. Once the transistor $Q_2$ turns on, the output of the amplifier 31 will increase from −5 volts to about −1 volt to produce the first half of the first cycle in the waveform A.

When the output of the amplifier 31 reaches the −1 volt level, the output of the amplifier 37 will switch from −5 volts to +5 volts to again forward bias the diode $D_1$, turn the transistor $Q_3$ on and thereby turn the transistor $Q_2$ off while turning the transistor $Q_1$ on. That restores the positive control voltage ($+E_0$) to the amplifier 31 so that its output will be driven at a constant rate from about −1 volt toward −5 volts to complete the first cycle of the waveform A. The rate at which the output of the amplifier 31 is driven from −5 volts to −1 volt and thereafter back to −5 volts is dependent upon the amplitude of the control voltage $E_0$. The greater the control voltage amplitude, the greater the rate, and therefore the higher the frequency of the oscillator.

The output of the amplifier 37 is applied directly to the logic network 25 (FIG. 1) as a square wave of the same frequency as the sawtooth waveform, as shown by the waveform B of FIG. 2.

The waveform B is differentiated by a capacitor 41 and resistor 42 to provide negative and positive spikes at negative and positive going edges. The positive spikes are inverted by a transistor $Q_5$ while the negative spikes are suppressed due to reverse biasing of the base-emitter junction of the NPN transistor $Q_5$, thereby producing the waveform C.

The sawtooth waveform A at the output of the amplifier 31 is applied to the negative (inverting) terminal of a high gain differential amplifier 43 through a resistor 44 while a reference voltage $-V_r$ is applied to the positive (noninverting) terminal from a voltage dividing network comprising resistors 45 and 46. The resistor 46 may be a potentiometer as shown to adjust the voltage $-V_r$ to any desired level. The voltage $-V_r$ (represented in FIG. 2 by a horizontal dotted line in the waveform A) is set at a median level of the waveform A so that the output of the amplifier 43 is a train of negative pulses, each at the center of the current cycle of the waveform A and of a period equal to 50 percent of the period of waveform A cycle. The negative pulses thus produced are inverted by a transistor $Q_6$ to produce the waveform D.

It should be noted that the period of each pulse in the waveform D has been shown as 50 percent of the corresponding cycles of the waveform A for simplicity of explanation only. In practice, the period of each pulse would be set to about 10 percent, as noted hereinbefore, by adjusting the reference voltage $-V_r$ until each pulses of the waveform D is only approximately 10 percent of the current cycle of the waveform A.

Referring now to FIG. 4, the logic network 25 which receives the waveforms B and D, and the ion detector pulses shown in the waveform E, will now be described. NAND gates 51 and 52 functioning as AND gates receive the waveform D directly while the NAND gate 52 receives the waveform B through an inverter 53.

The return pulses from the ion detector are applied to the NAND gates 51 and 52 to trigger one of two monostable multivibrators 54 and 55 depending upon whether a given return pulse has been received too late, in which case, it is transmitted only through the NAND gate 51, or too early, in which case it is transmitted only through the NAND gate 52. Both output terminals of the NAND gates 51 and 52 are connected to NAND gate 56 functioning as an OR gate to turn on a transistor $Q_7$ and energize an incandescent lamp 57 each time an ion detector pulse is being received within the periods of the gating pulses shown in the waveform D of FIG. 2.

The gates 51 and 52 are implemented as NAND gates so that cy connecting the output of the NAND gate 52 directly to a NAND gate 58, and the output of the NAND gate 51 to the NAND gate 58 through an inverter 59, a return pulse transmitted by the NAND gate 52 will be inverted to effectively lock out a return pulse transmitted by the NAND gate 51. Accordingly, if a sheet of ions is detected at precisely the time the X-ray tube 13 is being triggered by a pulse in the waveform C, a return pulse may cause both NAND gates 51 and 52 to transmit a pulse, but only the output of the NAND gate 52 is transmitted to the monostable multivibrator 55 via NAND gates 60 and 61. The output of the NAND gate 51 will not trigger the monostable multivibrator 54 via NAND gates 62 and 63 while the AND gate 52 is transmitting an ion detector pulse.

This lockout arrangement, which gives preference to a "too early" indication in the event of ambiguity due to an ion trigger pulse being detected at precisely the center of a cycle of the waveform A, is effective for only narrow return pulses. Wide return pulses could produce output signals through the NAND gate 51 to trigger the monostable multivibrator 54 after the NAND gate 52 is no longer transmitting an output signal. Accordingly, it is preferred that the return pulses from the ion detector 24 (FIG. 1) be short, high-peak pulses.

The output pulses from the monostable multivibrators 54 and 55 are transmitted to the integrator 19 (FIG. 1) via lines 27 and 28. However, if the integrator is responsive to only the leading edges of the pulses from the monostable multivibrators, failure to lock out the output of the NAND gate 51 would simply result in a "too late" indication cancelling the "too early" indication, thereby leaving the control voltage $E_0$ unaltered. Except for a negligible period of time, the change in the period waveform A during the next cycle would not be noticeable. This, of course, assumes the response time of the integrator 19 is sufficiently short to respond to the leading edges of both "too early" and "too late" pulses. If not the integrator will inherently lock out the "too late" pulse.

The NAND gates 60 to 63 are provided to enable the integrator 19 to be run up or down manually for initial acquisition of ion detector pulses within the periods of pulses in the waveform D. A double pole, three position switch $S_1$ connects circuit ground to the NAND gates 60 and 62 to lock out pulses from the AND gates 51 and 52 during manual acquisition. The second pole of the switch 60 connects a free running relaxation oscillator 64 to either the NAND gate 61 or the NAND gate 63, depending upon whether the integrator 19 is to be run up or down for acquisition.

The digital integrator will now be described with reference to FIG. 5. It consists of an updown binary counter 65 with preset input terminals connected to circuit ground so that when a reset switch $S_2$ is momentarily closed, the counter is set to a predetermined number, such as 25, which is empirically found to correspond to a flow rate below the expected range of flow rates, typically 5 to 40 feet per second. Once the counter has been reset to the predetermined number, the manual acquisition switch $S_1$ (FIG. 4) is operated to cause the counter to count up until return pulses are being received from the ion detector during the periods of the pulses in the waveform D, at which time the lamp 57 will be triggered on by the acquired ion detector pulses. Thus, by always starting from a count known to be low low, instead of from a median, apparatus (such as an oscilloscope) is not required to determine the direction the integrator should be run for manual acquisition. As an alternative to manual acquisition, an automatic acquisition circuit may be included, again starting from a count known to be too low to facilitate implementation.

Once return pulse acquisition has been achieved, the switch $S_1$ is returned to its neutral position to allow the logic network 25 and integrator 19 to continually drive the period of the waveform A toward the period of the detected pulses. That is accomplished by varying the control voltage $E_0$ in accordance with the digital output of the counter 65. The range of the control voltage is preferably from +30 millivolts to +8 volts with a median of +4 volts. That median is set by a potentiometer 66 connected to a source of fixed negative voltage (about 6 volts) provided by a zener diode $D_2$ connected to a source of −12 volts through a resistor 67. An operational amplifier 68 having a negative feedback resistor 69 equal to a coupling resistor 70 inverts the negative voltage selected through the potentiometer 66 to provide a positive median control voltage to the positive input terminal of a high gain differential amplifier 71 having a negative feedback resistor 72 connected to its inverting input terminal.

The positive control voltage from the amplifier 68 is coupled to the negative input terminal of the amplifier 71 through a resistor 73 equal to the negative feedback resistor 72 via a differential amplifier 74 connected as a non-inverting operational amplifier. With the output voltages from the amplifiers 68 and 74 of equal amplitude and the same polarity, the output voltage $E_0$ from the amplifier 71 is zero. For the median control voltage $E_0$ of approximately +4 volts desired when the counter 65 is counted up to a median number, digital-to-analog converting resistors $R_1$ through $R_{11}$ are connected to the summing junction between the resistors 72 and 73.

The resistors $R_1$ to $R_{11}$ are weighted for converting a binary number into an analog voltage. Therefore, each successive one of the resistor $R_1$ through $R_{11}$ is half the value of its preceeding resistor, and the resistor $R_1$ for the least significant bit is so selected that with the predetermined number set in the counter 65, the output of the amplifier 71 is at the desired level of approximately 30 millivolts.

Although a straight binary counter is shown for simplicity, in practice it may be desirable to employ a binary-coded decimal counter. The converting resistors would then be binary coded in groups of four, with each successive group of four weighted ten times as much.

The respective digital-to-analog converting resistors $R_1$ through $R_{11}$ are connected to output terminals $2^0$ to $2^{10}$, respectively, of the binary counter 65. When a given output terminal $2^n$ of the counter 65 is true, the switch connected thereto is turned on to connect the associated converting resistor $R_n+1$ to circuit ground. For example, when the most significant bit of the counter 65 is true, a switching transistor $Q_{11}$ is turned on to connect the resistor $R_{11}$ to ground. While the transistor $Q_{11}$ is not turned on, the resistor $R_{11}$ is effectively removed from the circuit that determines the voltage at the negative input terminal of the amplifier 71, and therefore out of the circuit that determines the level of the control voltage $E_0$ transmitted to the voltage controlled oscillator 17 (FIG. 1).

Although a particular embodiment of the invention has been described and illustrated herein, it is recognized that modifications and variations may readily occur to those skilled in the art, such as injecting other types of tracers, particularly for monitoring the flow of a liquid instead of a gas since ions will recombine too quickly in liquids. For example, radioactive isotopes of the liquid may be effectively injected using a particle emitter such as gamma ray gun in place of the X-ray gun disclosed for effectively injecting ions as tracers.

The radioactive isotopes will then emit various radiations, each having a certain half-life. A radiation detector may then be employed at the tracer detecting station. Accordingly, it is intended that the limitation of injecting a tracer into a fluid cover both the effective injection of ions as well as the actual injection of tracers of other forms and that the claims be so interpreted as well as to cover other modifications and variations which may readily occur to those skilled in the art.

What is claimed is:

1. Apparatus for monitoring the flow of fluid in a pipeline comprising controlled means for periodically generating trigger pulses, means responsive to said trigger pulses for injection into said fluid at a first fixed station in said pipeline tracers which may be carried by said fluid, one tracer for each trigger pulse, means at a second fixed station downstream from said first fixed station for detecting said tracers, means responsive to said tracer detecting means for controlling said trigger pulse generating means to generate trigger pulses substantially in time coincidence with the anticipated detection of tracers based upon the rate at which tracers have been detected most recently, and means responsive to said trigger pulses for continually producing at least one of two types of flow measurements, said types being cumulative volume and flow rate.

2. A flow meter for monitoring the flow of fluid in a pipeline comprising controlled means for periodically generating trigger pulses, means responsive to said trigger pulses for injecting into said fluid at a first fixed station in said pipeline tracers which may be carried by said fluid, one tracer for each trigger pulse, means at a second fixed station downstream from said first fixed station for detecting said tracers and for producing a return pulse in response to each tracer detected, error detecting means for determining whether a return pulse is produced by said tracer detecting means early or late with respect to trigger pulses generated by said controlled means, control means responsive to said error detecting means for controlling said trigger pulse generating means to generate trigger pulses at substantially the same times that tracers are being detected by said tracer detecting means, and means responsive to said trigger pulses for continually producing at least one of two types of flow measurements, said types being cumulative volume and flow rate.

3. A flow rate meter as defined in claim 2 wherein said trigger pulse generating means is controlled by an electrical signal to generate trigger pulses at a rate proportional to the amplitude of said signal, and said control means comprises means for generating an early or a late error pulse according to whether said error detecting means determines whether a given pulse produced by said tracer detecting means occurred too early or too late with respect to a trigger pulse for injecting the next tracer to be detected, means for integrating said early and late error pulses, and means responsive to said integrating means for altering the amplitude of said control signal in response to each error pulse in a direction which will cause the next pulse generated by said tracer detecting means to be detected closer in time to a trigger pulse generated to inject the next tracer to be generated.

4. A flow rate meter as defined in claim 3 wherein said integrating means comprises digital means for counting in one direction in response to an early error pulses and in an opposite direction in response to a late error pulse, whereby a high degree of stability in the control signal is achieved for extended periods during which tracers are not detected.

5. A flow rate meter as defined in claim 3 wherein said means for generating said pulses includes means for generating a square-wave and means for timing said trigger pulses to occur at the center of each cycle of said square-wave, and wherein said error detecting means includes means for comparing the time of a detector pulse with the phase of said squarewave to determine whether a tracer has been detected too early or too late.

6. A flow rate meter as defined in claim 5 wherein said controlled means for generating said trigger pulses further includes means for generating gating pulses, each gating pulse of a duration that is a predetermined fraction of the current cycle of said periodic trigger pulse generating means and centered on the time that a trigger pulse is generated at the center of said current cycle, and said comparing means is responsive to said gating pulse generating means to enable an error determination to be made only during the presence of a gating pulse.

7. A flow rate meter as defined in claim 6 wherein said controlled means for generating said trigger pulses comprises means for generating a symmetrical sawtooth waveform of substantially constant amplitude with a period directly proportional to the amplitude of said control signal, and said gating pulse generating means comprises means responsive to said sawtooth waveform for producing said gating pulses when said sawtooth waveform exceeds a predetermined level, whereby the period of each gating pulse is a substantially constant percentage of the cycle of said sawtooth waveform during which generated, and each gating pulse is centered about the center of the cycle of said sawtooth waveform during which generated.

8. A flow rate meter as defined in claim 7 wherein said controlled means for periodically generating trigger pulses comprises means responsive to said sawtooth waveform for producing a trigger pulse at said center of each cycle of said sawtooth waveform.

9. A flow rate meter as defined in claim 8 wherein said means responsive to said sawtooth waveform for producing a trigger pulse at said center of each cycle of said sawtooth waveform comprises means responsive to said sawtooth waveform for generating a square waveform, each cycle having a period corresponding directly to the period of said sawtooth waveform, means for differentiating said square waveform to produce sharp pulses of a given polarity at the beginning of each cycle of said square waveform and of an opposite polarity at the center of each waveform, and means for suppressing said sharp pulses of said given polarity.

10. A flow rate meter as defined in claim 9 wherein said error detecting means comprises two three-terminal gates, each connected to receive said return pulses and said gating pulses at two terminals, and one of said gates connected to receive said square waveform, and an inverter coupling said square waveform to the other one of said two gates.

* * * * *